United States Patent
Von Nordenskjold

[11] Patent Number: 5,811,008
[45] Date of Patent: Sep. 22, 1998

[54] PROCESS AND SYSTEM FOR PURIFICATION OF WASTE WATER

[76] Inventor: Reinhart Von Nordenskjold, 3 Killistrasse 3, D-85658 Egmating-Munster, Germany

[21] Appl. No.: 667,410

[22] Filed: Jun. 21, 1996

[30] Foreign Application Priority Data

Jun. 22, 1995 [DE] Germany ............... 195 22 658.5

[51] Int. Cl.⁶ .................................................. C02F 3/30
[52] U.S. Cl. .................... 210/605; 210/614; 210/622; 210/630; 210/195.1; 210/195.3; 210/903; 210/906
[58] Field of Search .................... 210/605, 614, 210/622, 623, 624, 630, 195.1, 195.3, 195.4, 259, 242.1, 903, 906

[56] References Cited

U.S. PATENT DOCUMENTS

| | | | |
|---|---|---|---|
| 3,964,998 | 6/1976 | Barnard | 210/906 |
| 4,056,465 | 11/1977 | Spector | 210/906 |
| 4,287,062 | 9/1981 | von Nordenskjöld | 210/199 |
| 4,377,477 | 3/1983 | Dunkers | 210/242.1 |
| 4,664,792 | 5/1987 | Fors et al. | 210/242.1 |
| 4,797,212 | 1/1989 | von Nordenskjöld | 210/614 |
| 5,011,605 | 4/1991 | Pape et al. | 210/624 |
| 5,021,161 | 6/1991 | Calltharp | 210/614 |
| 5,098,572 | 3/1992 | Faup et al. | 210/906 |
| 5,304,308 | 4/1994 | Tsumura et al. | 210/614 |
| 5,472,611 | 12/1995 | von Nordenskjold et al. | 210/624 |
| 5,534,141 | 7/1996 | McAnaney et al. | 210/242.1 |

FOREIGN PATENT DOCUMENTS

4236791C1  4/1994  Germany.

OTHER PUBLICATIONS

German article entitled "Biologische Phosphorentfernung", pp. 337–348. (English Translation).

German article entitled "Biologische Phosphorentfernung", pp. 337–348, Mar. 1989.

*Primary Examiner*—Christopher Upton
*Attorney, Agent, or Firm*—Baker & Botts, L.L.P.

[57] ABSTRACT

A process and a system for the purification of waste water in several successive stages includes a first stage for anaerobic treatment of the waste water, a second stage for aerobic treatment of the waste water, a third stage for clarification and sedimentation of the waste water with a sludge return, and an arrangement for controlling the residence time of the waste water in the anaerobic stage by varying the volume of the anaerobic stage.

15 Claims, 1 Drawing Sheet

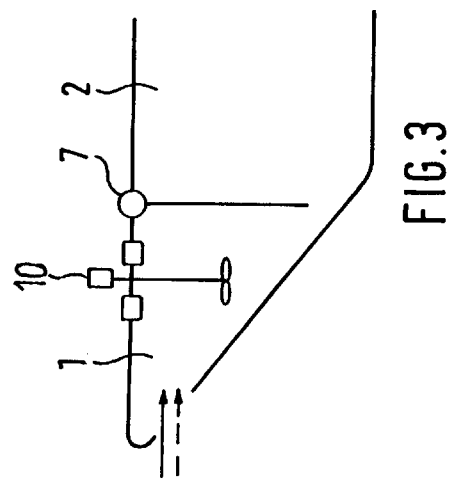
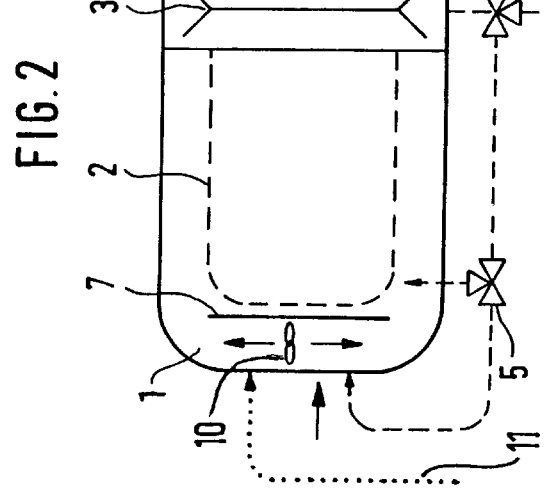
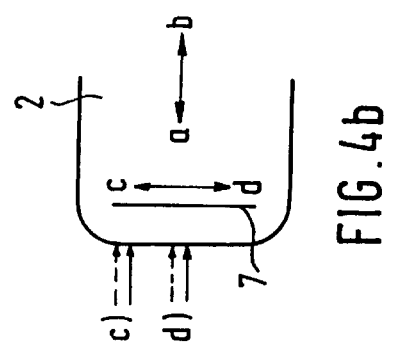
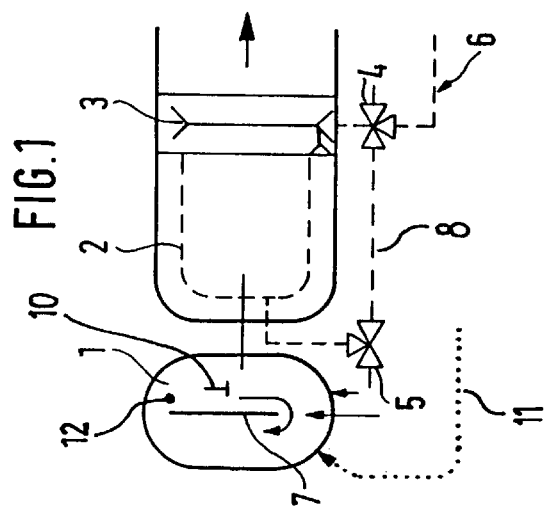
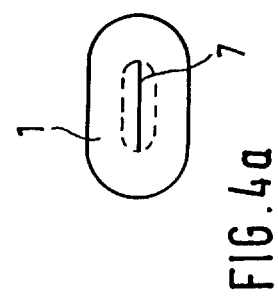

PROCESS AND SYSTEM FOR PURIFICATION OF WASTE WATER

BACKGROUND OF THE INVENTION

This invention relates to processes and systems for the purification of waste water.

U.S. Pat. No. 5,472,611, the disclosure of which is incorporated herein by reference, discloses a process and system for purifying waste water flowing through a basin in several successive stages. In a first stage A of this known process the waste water is aerated, and then, in a second stage B, which also includes a sludge return, intermediate clarification with sedimentation is carried out, while a re-aeration takes place in a third stage C and a re-sedimentation occurs in the fourth stage D. All four stages A through D are carried out in the same basin. In the aeration stage A, the waste water is introduced into an active sludge region A of the basin and aerated with air or oxygen and circulated, so that an aerobic process of decomposition takes place. For the intermediate clarifying stage B, the waste water flows in the direction of flow through the basin from the active sludge region A through an outlet in the lower portion of a separating wall into the intermediate clarification region B. In this region active sludge settles to the bottom and is withdrawn with a sludge remover. Then, the waste water passes from the intermediate clarification clarifying region B through an outlet in the upper portion of another separating wall into the re-aerating region C, where it is again aerated with oxygen and circulated. Finally, the waste water passes from the re-aeration stage C through the lower portion of another partition into the resedimentation stage D from which sludge is withdrawn by a sludge remover.

In addition, as described in U.S. Pat. No. 5,472,611 the aeration stage A may be preceded by a so-called biological phosphorus (BP) removal region where the waste water is treated anaerobically. This treatment promotes the elimination of biological phosphorus compounds, utilizing the ability of the bacteria to store elevated amounts of phosphorus in the aerobic part of the system, by interposing an anaerobic preliminary treatment in the active sludge treatment basin. There is a certain optimal residence time $t_{BP}$, of about 1½ hours, for the waste water in this region, as well as for the sludge returned from the active sludge region into the BP region. The size of the BP region is selected to match this optimum period of 1½ hours based on the rate of flow of waste water through the BP stage. The BP stage is not adaptable to fluctuations in daily quantities or to seasonal variations in the flow of waste water which can change not only the residence time $t_{BP}$, but also the temperature, the quantity of acidifying bacteria, the quantify of acidifiable substances and their composition, and the $O_2$ potential in the BP region, or to different types of waste water in general.

SUMMARY OF THE INVENTION

Accordingly, it is an object of the present invention to provide a process and system for purification of waste water which overcomes the disadvantages of the prior art.

Another object of the invention is to provide a process and system for purification of waste water which is adaptable in response to changes in the required waste water purification conditions.

These and other objects of the invention are attained by providing a multistage waste water purification process and system which includes a preliminary anaerobic stage in which the reaction process is controlled by varying the residence time of the waste water in the anaerobic stage by changing the volume of the anaerobic stage.

In accordance with the invention, therefore, a process for purifying waste water in several successive stages, in which the waste water is aerated in a first stage A and then clarified in a second stage B having a sludge return, and then optionally re-aerated in a third stage C and re-sedimented in a fourth stage D, also has a preliminary anaerobic stage in which the reaction time is controlled by varying the volume of that stage to control the waste water residence time.

In certain cases, the sludge return or the supply of active sludge in the anaerobic phase may be increased. Instead of only a sludge return or an active sludge supply, however, waste water may also be returned to the anaerobic stage and excess sludge may be added to the return waste water.

In addition, materials which preferentially absorb oxygen may also be added in the anaerobic stage.

Moreover, the region containing the anaerobic stage may be covered and, as noted above, the residence time of the waste water in the anaerobic region may be varied.

Heretofore, to avoid fluctuations in the rate of flow of waste water through an anaerobic stage, auxiliary basins or tanks were used as buffers to hold waste water during excess flow periods and to supply waste water during low flow periods. Such arrangements, however, do not provide flow rate control, especially at night. Moreover, the waste water from industrial regions may change abruptly, for example with respect to the quantity of acidifiable substances and their composition. Temperature fluctuations may also occur and, in extreme cases, it is also possible that oxygen may be introduced into the anaerobic region. All this may lead to inadequate performance of the anaerobic process, diminishing the removal of phosphorus and causing insufficient treatment of the waste water entering the active sludge region. On the other hand, the anaerobic process may proceed too intensively, causing serious damage to the active sludge and producing very offensive odors.

The residence time of the waste water in the anaerobic stage may be increased very simply and effectively by increasing the volume of the anaerobic region. A good additional measure, also effective in the short term, is to supply more return sludge or return waste water, to which excess sludge may be added, and this sludge, as an example of a typical oxygen-consuming component, may partially or entirely support the acidifying process in the anaerobic stage.

The procedure for varying the volume of the anaerobic stage will depend on the type of basin or tank used for that stage, and will be discussed hereinafter.

The invention also provides a system with a variable capacity for the preliminary anaerobic treatment region to permit adaptation of the system without substantial cost, to relatively rapid variations in processing conditions, i.e., fluctuating or altered quantities or constituents of the waste water.

BRIEF DESCRIPTION OF THE DRAWING

Further objects and advantages of the invention will be apparent from the reading of the following description in conjunction with the accompanying drawings in:

FIG. 1 is a schematic top view illustrating a representative embodiment of a system for purification of waste water according to the invention in which the anaerobic and aerobic processes are carried out in separate basins;

FIG. 2. is a schematic fragmentary top view of another representative embodiment of a system according to the invention in which the anaerobic process is carried out in the same basin as the aerobic process;

FIG. 3 is a vertical longitudinal sectional view of the basin shown in FIG. 2; and FIGS. 4a and 4b are schematic fragmentary plan views showing two arrangements for the anaerobic stage which are capable of varying the volume of that stage.

DESCRIPTION OF PREFERRED EMBODIMENTS

As mentioned at the outset, it has not been possible heretofore to adapt existing waste water purification systems to varying conditions with respect to biological phosphorus elimination. Although there has been a need for such adaptation, no simple solution has been suggested. It is well known that the drainage networks of the areas supplying waste water to be purified are subject to enormous fluctuations according to time of day and the season of the year, not to mention melting snows and rainstorms. These fluctuations not only produce different quantities of water but also introduce oxygen in varying amounts into the waste water. The composition of the waste water to be clarified also varies when industrial waste is added to the usual domestic waste water.

It is known also that one of the principal parameters for the elimination of biological phosphorus is the residence time $t_{BP}$ of the waste water in the anaerobic phase, which is normally about 1½ hours. The actual required residence time $t_{BP}$ depends, of course, on the temperature, on the quantity of acidifying bacteria, on the quantity of acidifiable substances and their composition, on the $O_2$ potential and also on the possible $O_2$ supply, and other factors as yet unknown but which are no doubt essentially functions of time. Consequently, the optimal exposure time may be different from case to case, leading to dilemmas with respect to dimensioning of the basin regions even at the planning stage.

Therefore, there has long been a need for a waste water purification system capable of adaptation in terms of optimal anaerobic stage residence time even after the system has been built. If the anaerobic stage residence time is too long, the nuisance of odors in the surrounding area may often become unacceptable. In addition, active sludge in the waste water is damaged by anaerobic exposure, and this must be also be avoided. These problems are solved quite simply in accordance with the invention by providing a variable volume for the anaerobic region in which biological phosphorus elimination is carried out, i.e., the so-called BP stage. This solution to the problem will explained further with reference to FIGS. 1 and 4.

In practice there are at present two different types of systems for purifying waste water by using active sludge. In FIG. 1, a biological phosphorus (BP) elimination basin 1 is provided which is spatially separated from an active sludge basin 2. The active sludge basin 2 is in this case divided into several regions, not all of which, however, are necessary to the present invention. Waste water and the return sludge from the active sludge basin are returned to the BP basin 1 in which they are mixed with the incoming waste water and circulated thoroughly around a partition 7 by an agitator 10. The mixture is then passed into the active sludge basin 2 and, after aerobic treatment, into a clarifying and sedimentation stage 3, which may also have a variable volume. Active sludge withdrawn from the sedimention stage 3, passes, partially or completely, to two sludge distribution stations 4 and 5. All of the removed active sludge, or only a portion of it according to need, is then reintroduced through a line 8 into the preliminary BP treatment basin 1 together with the incoming waste water to be purified, and/or directly to the first stage of the active sludge basin 2. Part of any surplus sludge may be transferred to a surplus basin by a line 6. Also, any recirculated waste water can be reintroduced into the process through a return line 11. If necessary, excess sludge may be supplied to the recirculated waste water as well.

The waste water leaving the clarifying and sedimentation region 3 may be further processed in the manner described, for example, in U.S. Pat. No. 5,472,611.

According to another embodiment, shown in FIGS. 2 and 3, the anaerobic BP stage is provided in the same basin as the aerobic active sludge stage. In this arrangement the waste water is introduced into a BP stage 1 located at the inlet end of the basin, which is at least partially separated from the active sludge stage 2 by a partition 7. This is followed, as in the embodiment of FIG. 1, by the clarifying and sedimention stage 3. As in the previous embodiment, active sludge removed in the sedimentation stage may be separated at a distribution station 4, in which case a portion is returned through a line 8 into the BP region at the inlet end, and any remainder is conveyed by a line 6 into a storage or surplus basin or tank. Likewise, for example when no surplus sludge is to be drawn off, the separation may take place at a distribution station 5 in order to add some of the returned sludge directly to the aeration region of the basin by a line 9.

As in the previous example, further treatment of the waste water may take place in a conventional manner.

In the BP stage, an acidifying process takes place, producing a higher-grade or higher-energy nourishment in the waste water for the bacteria of the active sludge, thus enabling the bacteria to achieve a higher biological phosphorus uptake. This is understood to proceed so far that phosphorus is converted into phosphate in crystalline form and thereby absorbed in distinctly greater amounts producing increases of form 30% to 90% phosphate uptake.

The waste water in the BP stage 1 of the integrated basin is not aerated or totally circulated, but merely agitated by the agitator 10, as best seen in FIG. 3, and blended from time to time.

When it has been found necessary to change the volume of the BP zone to adjust the flow rate therein to current requirements, thereby abating odor nuisance and destruction of the active sludge, and securing the optimum biological phosphorus elimination, the necessary steps can be taken, in each of the systems shown in FIG. 1 and 2, in the manner shown in FIGS. 4a and 4b. In the variant shown in FIG. 4a, which corresponds to the separate BP region shown in FIG. 1, the oval BP stage basin is spatially separated from the active sludge basin and has an inner partition 7 which can be changed in volume so as to vary the volume of the BP stage. This may be done, for example, by making the partition 7 inflatable, or by making it in the form of two partitions capable of being pushed apart like an accordion, thus creating a hollow space within the BP stage. In other words, the partition 7 is either inflated or deflated, or it moves apart or back together, to reduce or enlarge the volume of the BP region. Alternatively, the curtain 7, suspended from a roller as shown in FIG. 3, may be rolled up or down vertically.

In the modification shown in FIG. 4b, which corresponds to the integrated BP region arrangement shown in FIGS. 2 and 3, the partition 7 may be variously designed. In one arrangement, the partition 7 is shifted in the direction "a" to enlarge the volume of the BP region or in the direction "b" to reduce the volume of the BP region. The partition may also be rolled up in the direction from "c" to "d" or from "d" to "c" in FIG. 4b. When rolled up in the direction "d" to "c", the supply of fresh waste water (shown by a solid line) and active sludge (shown by a dash line) is preferably introduced in a direction toward the location "c" as shown in FIG. 4b.

However, the arrangement FIG. 4a may be similar to the arrangement of FIG. 4b if the basin is made square or rectangular instead of oval. In this case, one or two barriers 7 may likewise be provided which are capable of being displaced inside the basin.

The adaptability of the system may be further enhanced, especially for short-term process variations, by providing an increased sludge return or sludge supply. With this arrangement, a part of, or the entire quantity of, active sludge removed or in circulation in the active sludge stage is recycled into the BP stage and, if that is not enough, active sludge may also be returned to the system from the surplus tank, and recirculated waste water may be used as well, as indicated by the line 11 in FIG. 2.

An enhancement of biological phosphorus removal may also be effected by adding $O_2$-absorbing substances, for example by increasing the supply of oxygen-consuming contaminants from a buffer tank into the anaerobic region 1.

It is also possible to supply water through the line 11 to the inlet end of the basin 1 to reduce the residence time $t_{BP}$.

Finally, if there is a control lag in response to extreme variations, the BP region may also be covered or closed by a movable cover to abate offensive odors.

As described above, the controllable anaerobic stage precedes the aerobic active sludge stage. The anaerobic stage involves the following principal variables:

a) Residence time $t_{BP}$
b) Temperature
c) Quantity of acidifying bacteria
d) Quantity of 'acidifiable' substances and their composition
e) $O_2$ potential, i.e., incl. possible $O_2$ supply ($O_2$ not desirable)
f) Redox potential
g) Other factors not yet investigated, doubtless essentially functions of time The residence time of the waste water in the aerobic process is usually a matter of days rather than hours. Consequently, no abrupt adaptation to changes in outside circumstances is needed for the aerobic process. The aerobic active sludge process, however, is dependent on the anaerobic process of the preceding phase, especially with respect to biological phosphorus removal. If something goes wrong in the anaerobic stage, the aerobic active sludge phase may collapse, and this may necessitate a shutdown of the system so that no purification of the waste water can take place.

Thus, the process conditions in the BP stage should be properly controlled. In waste water treatment systems, as described above, a change of condition or an emergency is not always foreseeable, especially at night and on Sundays and holidays. It is expedient therefore to control the waste water treatment processes, most simply of course by the sense of smell, on the principle that if it smells strongly then it is urgently necessary that something should be done. It is of course a chore, in view of wind and weather, to sniff the system at regular intervals. Moreover, in such observations, the nose may fail, and it may be too late for an appropriate control correction. This can be avoided if laboratory measurements are made at intervals in batch form or continuously. Continuous analysis in the laboratory by means of a sample flow, or directly in the anaerobic stage 1, may be the safest course. Beside sample analyses, the redox potential should also be measured continuously in millivolts. Such measurements have been carried out in BP stages of fixed volume, for example at the location 12 in FIG. 1. Over many months, such measurements have demonstrated the need for volume adaptation of the residence time in the BP stage. It is also possible to trigger the change of volume of the BP basin automatically. Other methods of measurement and control procedures may also be possible.

The pH value of the waste water in the BP stage may be measured as well, but it will be understood that pH measurement does not function equally well in all measurements and types of waste water.

Another alternative for automatic triggering of the BP stage volume control is continuous or intermittent measurement of waste water inflow rate and inflow temperature, the air temperature, and the basin temperature, as well as the monitoring of the flow rates.

It should again be noted that the further processing of the waste water or the active sludge, as described in U.S. Pat. No. 5,472,611 is not essential to the invention.

Although the invention has been described herein with reference to specific embodiments, many modifications and variations therein will readily occur to those skilled in the art. Accordingly, all such variations and modifications are included within the intended scope of the invention.

I claim:

1. A process for purification of waste water in several successive stages comprising subjecting the waste water to anaerobic treatment in a first stage, subjecting waste water from the first stage to aerobic treatment in a second stage, subjecting waste water from the second stage to clarification and sedimentation in a third stage and controlling the volume of the first stage to control the residence time of the waste water in the anaerobic treatment stage to permit rapid adjustment of the residence time in the anaerobic treatment stage during operation of the process to accommodate varying waste water treatment requirements.

2. A process according to claim 1 including the step of supplying sludge to the anaerobic treatment stage and varying the supply of sludge to the anaerobic treatment stage in accordance with varying process conditions.

3. A method according to claim 1 including the step of recycling waste water from a later stage in the process to the anaerobic treatment stage.

4. A method according to claim 3 including adding sludge to the recycled waste water supplied to the anaerobic treatment stage.

5. A process according to claim 1 comprising adding substances which absorb oxygen to the anaerobic treatment stage.

6. A method according to claim 1 comprising providing a cover for the anaerobic treatment stage.

7. A process according to claim 1 comprising varying the volume of the waste water in the anaerobic treatment stage in accordance with a detected process condition.

8. A process according to claim 1 comprising varying the volume of the waste water in the anaerobic treatment stage automatically at least partially in accordance with a continuous redox measurement.

9. A system for purifying waste water comprising an anaerobic treatment region for biological phosphorus removal, an active sludge region for aerobic treatment of waster water received from the anaerobic treatment region, a clarification and sedimentation region for clarification of waste water received from the aerobic treatment region, a return line for recycling active sludge from the sedimentation region to a preceding region in the process, and an arrangement for varying the volume of the anaerobic treatment region to vary the residence time of the waste water being subjected to anaerobic treatment to permit rapid adjustment of the residence time in the anaerobic treatment region during operation of the system to accommodate varying waste water treatment requirements.

10. A system according to claim 9 wherein the arrangement for varying the volume of the anaerobic treatment region includes an inflatable member disposed in that region.

11. A system according to claim 9 wherein the arrangement for varying the volume of the anaerobic treatment region includes a retractable wall.

12. A system according to claim 9, wherein the anaerobic treatment region is the same basin as the active sludge region and is separated therefrom by a horizontally displaceable wall.

13. A system according to claim 12 including an inlet for waste water and active sludge to the anaerobic treatment region wherein the location of the inlet is controlled in accordance with the location of the displaceable wall.

14. A system according to claim 9 wherein the anaerobic treatment region is in the same basin as the active sludge region and is separated therefrom by a curtain capable of being rolled up or down vertically.

15. A system according to claim 9 including a cover for the anaerobic treatment region.

* * * * *